(12) United States Patent
Gates et al.

(10) Patent No.: US 6,732,421 B2
(45) Date of Patent: May 11, 2004

(54) METHOD FOR PRODUCING MAGNETORESISTIVE HEADS ION BOMBARDMENT ETCH TO STRIPE HEIGHT

(75) Inventors: Jane K. Gates, Minnetonka, MN (US); Jeffery K. Berkowitz, Carver, MN (US); Lance E. Stover, Eden Prairie, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/104,525

(22) Filed: Mar. 22, 2002

(65) Prior Publication Data

US 2003/0177631 A1 Sep. 25, 2003

(51) Int. Cl.$^7$ .............................. G11B 5/127; B44C 1/22
(52) U.S. Cl. .................... 29/603.12; 29/737; 29/603.16; 29/603.14; 216/66
(58) Field of Search ...................... 29/737, 729, 603.14, 29/603.12, 603.16, 603.18; 216/22, 61, 66; 204/192.33, 192.34

(56) References Cited

U.S. PATENT DOCUMENTS

| | | | |
|---|---|---|---|
| 5,563,752 A | 10/1996 | Komuro et al. ............. 360/113 |
| 5,883,770 A | 3/1999 | Biskeborn et al. ...... 360/130.21 |
| 5,903,968 A * | 5/1999 | Shouji ...................... 29/603.09 |
| 5,916,423 A * | 6/1999 | Westwood ............. 204/192.32 |
| 6,063,244 A * | 5/2000 | Pinarbasi ............... 204/192.11 |
| 6,170,149 B1 * | 1/2001 | Oshiki et al. ............ 29/603.09 |
| 6,197,164 B1 * | 3/2001 | Pinarbasi ............... 204/192.11 |
| 6,199,267 B1 * | 3/2001 | Koshikawa et al. ..... 29/603.15 |
| 6,252,741 B1 | 6/2001 | Ahn ......................... 360/235.1 |
| 6,335,063 B1 * | 1/2002 | Chen et al. .................. 427/558 |

\* cited by examiner

*Primary Examiner*—Carl J. Arbes
*Assistant Examiner*—Tai Nguyen

(57) ABSTRACT

A method for producing magnetoresistive heads includes the steps of placing a substrate having a plurality of transducers in an environment including a focused ion beam. The focused ion beam is directed onto the first MR element. A property level, generally the resistance associated with the MR stripe, of the first MR element is monitored until the resistance reaches a desired level. The focused ion beam is redirected onto a second area of the substrate which includes the second MR element. The electrical resistance of the second MR element is monitored as the focused ion beam acts on the second MR element until the resistance of the MR element reaches a desired level. Using this process, the resistivity of individual MR elements within the substrate can be tightly controlled.

21 Claims, 10 Drawing Sheets

METHOD FOR PRODUCING MAGNETORESISTIVE HEADS ION BOMBARDMENT ETCH TO STRIPE HEIGHT

FIELD OF THE INVENTION

The present invention relates to the field of mass storage devices. More particularly, this invention relates to magnetoresistive ("MR") heads used in a disc drive.

BACKGROUND OF THE INVENTION

Many disc drives today use a transducer formed of two elements. A first element is a thin film head that is used for writing information representative of data to the surface of the memory disc. A second element is a magnetoresistive element or giant magnetoresistive element ("MR element") that is used to read information representative of data from the surface of the memory disc. The resistance of the MR element changes in the presence of a magnetic field so the MR element is used to sense transitions on the disc that have been previously written with the thin film write element. The transducer is typically housed within a small ceramic block called a slider. The slider is passed over the rotating disc in close proximity to the disc that includes magnetic transitions representative of data.

The process of forming individual sliders starts with forming multiple transducers on a surface of a ceramic wafer using semiconductor fabrication techniques. After forming the transducers on the wafer, the wafer is then sliced or cut to form an elongated bar having a row of transducers, also known as a rowbar. The row of transducers are positioned on the trailing edge of the rowbar. One aspect of the transducer is known as a magnetoresistive (MR) read element which consists of a stack of materials known as a stripe. The response of the MR transducer to the presence of a magnetic field is a change in resistance (delta R/R). The static resistance of the MR element is a critical dimension of reader performance and is a function of the stripe height. As a result, manufacturing includes removal of material to produce a stripe height that produces a head with a certain specified resistivity. During manufacture, the elongated rows of transducers are placed in carriers and material is removed by abrasive lapping to provide the specified stripe height via removal of material.

The initial steps of forming the MR elements on the wafers using semiconductor device fabrication techniques does not produce MR elements having uniform stripe heights. After the wafer has been sliced into rowbars lapping is used to both expose a cross-section of the reader stripe to the slider surface and to control the final MR stripe height. The MR stripe height is monitored during lapping by resistance feedback control. The removal of material from the sliced wafer or row of ceramic material by lapping removes about the same amount of material from every MR element associated with a row of MR elements. The result is that the resistivity of the MR elements varies significantly across the row of MR elements sliced from the ceramic wafer. In other words, the methods for removing material from a row of MR elements held on a holder treats each MR element in the row uniformly. This results in a wide distribution of stripe heights and a wide distribution of resistivity associated with the individual MR elements across the row of MR elements.

Still another problem associated with the MR element manufacturing process is that feedback as to the stripe height or resistivity of individual MR elements generally is not obtained during the lapping portion of the manufacturing process. Thus, the accuracy of determining stripe height or any parameter related to the stripe height is limited. This may result in a significant deviation or offset between the targeted and the actual value for stripe height.

Measuring and monitoring the cleanliness endpoint of a rowbar is also important. This entails monitoring the first derivative of resistance versus time (dR/dt). MR elements which do not incorporate this processing technique may become electrically ineffective due to the presence of material such as dead oxide layers and organic surface contamination or extraneous metal.

What is needed is a method and apparatus that can be used to carefully control the rate of material removal in forming the stripe height dimension and controllably remove extraneous material when it exists on individual MR elements within a row of MR elements. What is also needed is a method and apparatus for feedback control so that the stripe height and any related operating parameter can be controlled during manufacture of the MR elements. The combination of the aforementioned features into a process that narrows the distribution of the MR elements such that more of the elements have a selected stripe height or selected operating parameter. What is also needed is a method and apparatus that is both reliable and quick, such that it can be used to produce MR elements in large volume.

Another aspect of the transducer is the writer element. The writer element is fabricated on the wafer simultaneously with the MR element. After the rowbar is formed, the pole tip of the writer element may be recessed or protruding. If the pole tip is protruding, then it may contact the recording media, which would cause damage to the media and the pole tip. If the pole tip is recessed too far into the head, data will not be able to be written. Therefore, there is a need for a method and apparatus that evaluates and corrects the length of the pole tip as it relates to the air bearing surface.

As mentioned above, the transducer is processed onto the slider and the slider carries the transducer over the recording media. As the density of data tracks on the media continues to increase, increased efficiency of the magnetic read/write head is required. The trailing edge of sliders are positioned closer and closer to the recording media in order to ensure an accurate signal both to and from the transducer. As a result, the slider occasionally comes into contact with the recording media, which poses the problem of damaging the media and the slider. Thus, there is a need for a method and apparatus to measure and monitor a slider with a trailing edge, to process the trailing edge so that if it does contact the media, minimal damage will occur.

The present invention addresses these and other needs to this and other problems, and offers other advantages over current systems and devices.

SUMMARY OF THE INVENTION

A method for producing magnetoresistive heads that enables the individual adjustment of the dimension of selected property levels of the transducer to a specified or targeted level with improved accuracy and precision. The method of stripe height formation involves the exposure of MR transducers at the rowbar level of fabrication to a focused ion beam for sputter removal of material. An electrical property, generally the resistance associated with the MR stripe, of the MR element is monitored until the resistance reaches a desired level and the focused ion beam is blanked or deflected. This method may also be used to control the cleanliness endpoint of the MR element, the pole tip of the write element and the trailing edge of the slider.

The next MR element in the sequence of transducers along a rowbar, namely a second MR element, is exposed to the focused ion beam and its resistance is monitored during material removal by ion sputtering until the resistance endpoint is reached. This sequence of in situ resistance monitoring, sputter etching until endpoint, and moving to the next transducer along a rowbar is repeated until the rowbar is fully processed. Using this process, the resistivity of individual MR elements within the rowbar can be tightly controlled.

A method for producing magnetoresistive heads includes the steps of placing a rowbar having multiple magnetoresistive elements in an environment which includes a focused ion beam. The focused ion beam is directed onto a first area of the rowbar that includes a single, individual magnetoresistive element while a property level of the single, individual magnetoresistive element is monitored. The property is monitored while the focused ion beam acts on the single, individual magnetoresistive element. When the property level reaches a desired level, the focused ion beam is redirected onto a second area of the rowbar that includes a second single, individual magnetoresistive element. The process of monitoring the property level as the focused ion beam acts on the second magnetoresistive element until the property level reaches a desired level is repeated. All of the magnetoresistive elements are treated individually. Monitoring the property level includes the step of measuring the electrical resistance or other property of the magnetoresistive elements in situ to the ion sputtering environment.

Redirecting the focused ion beam onto successive areas of the rowbar includes placing the rowbar on a stage. The stage is moved so the focused ion beam is directed onto the successive area of the rowbar. Each area which receives individual treatment eventually becomes the trailing edge area of a slider.

A controller must be used to coordinate the processes of device measurement with material removal by ion etching. One way of measuring the electrical properties of each device is via probe contact. The first step in the process is for the controller to move the stage to the position of a first device. Electrical probes are then engaged so the resistivity of the transducing elements can be monitored by the controller. The focused ion beam is unblanked or otherwise directed to an area including a first transducing element and etching of that transducing element occurs until feedback related to the desired electrical property reaches a selected level. The focused ion beam is then deflected or blanked by the controller and the probe contact is removed from the first device. The controller increments the stage to a position corresponding to the second device and the series of process steps is repeated by the controller.

Advantageously, the method and apparatus allows for careful control of the dimensions of a transducer/slider so that the resistivity, cleanliness endpoint, pole tip of the writer element, and the trailing edge of the slider are tightly controlled. Since the property levels of the transducer/slider are tightly controlled, the signal output and the functional efficiency of the slider/transducer are within a selected, optimized range for most of the slider/transducers in a manufactured population. The focused beam, an electrical probe apparatus and electronic controls form a control loop that tightly control the process. The method and apparatus are reliable, such that the method and apparatus can be used in production of transducers and sliders for disc drives. A result of the ability to tightly control a particular critical dimension of the transducer and slider are that disc drives using these magnetic read-write recording heads enable higher aerial density information storage. Another advantage is that the yield of MR elements in a rowbar is improved due to tightened sigma values. Sigma values, or the standard deviation of the of the transducer elements, represent greater precision in manufacturing. Thus, higher capacity disc drives may be introduced because of this technology and disc drives capable of still further increases in storage capacity can be produced at the manufacturing level.

These and various other features as well as advantages which characterize the present invention should be apparent to those skilled in the art upon reading the following detailed description.

DETAILED DESCRIPTION

In the following detailed description of the preferred embodiments, reference is made to the accompanying drawings, which form a part hereof, and in which are shown by way of illustration specific embodiments in which the invention may be practiced. It is to be understood that other embodiments may be utilized and structural changes may be made without departing from the scope of the present invention.

Figure 1:
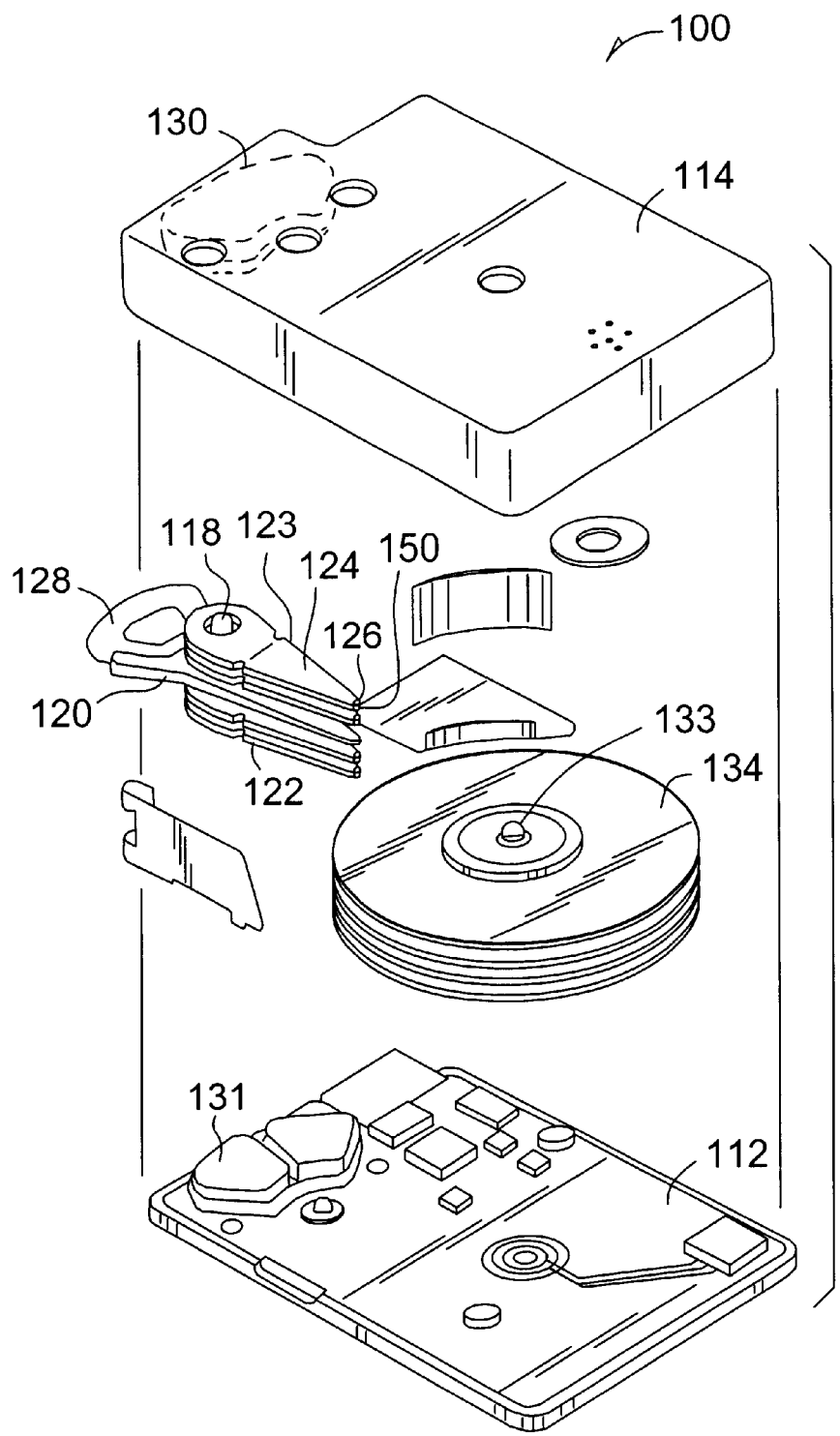
FIG. 1 is an exploded view of a disc drive with a multiple disc stack.

The invention described in this application is useful in any fabrication process for electronic devices where it may be advantageous to control an electronic device process during manufacturing. Without limitation one such process is during the removal of material from a substrate and more particularly a bar of sliders 126 that will be used in a disc drive 100. FIG. 1 is an exploded view of one type of disc drive 100. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 that carries a magnetic transducer 150. The slider 126 with the transducer 150 form what is many times called the head. The slider 126 shown includes a transducer with a separate read element and a separate write element. On the end of the actuator arm assembly 120 opposite the load springs 124 and the sliders 126 is a voice coil 128.

Attached within the base 112 is a pair of magnets 130 and 131. The pair of magnets 130 and 131, and the voice coil 128 are the key components of a voice coil motor that applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to such other disc drives.

Moving the actuator assembly 120 moves all the load springs 124. In operation, the actuator assembly 120 is moved to a park position when the disc drive is powered down. Moving the actuator to the park position causes the sliders to move to a non-data area of the disc. The non-data area is typically at the inner diameter ("ID") of the disc 134.

Figure 2:
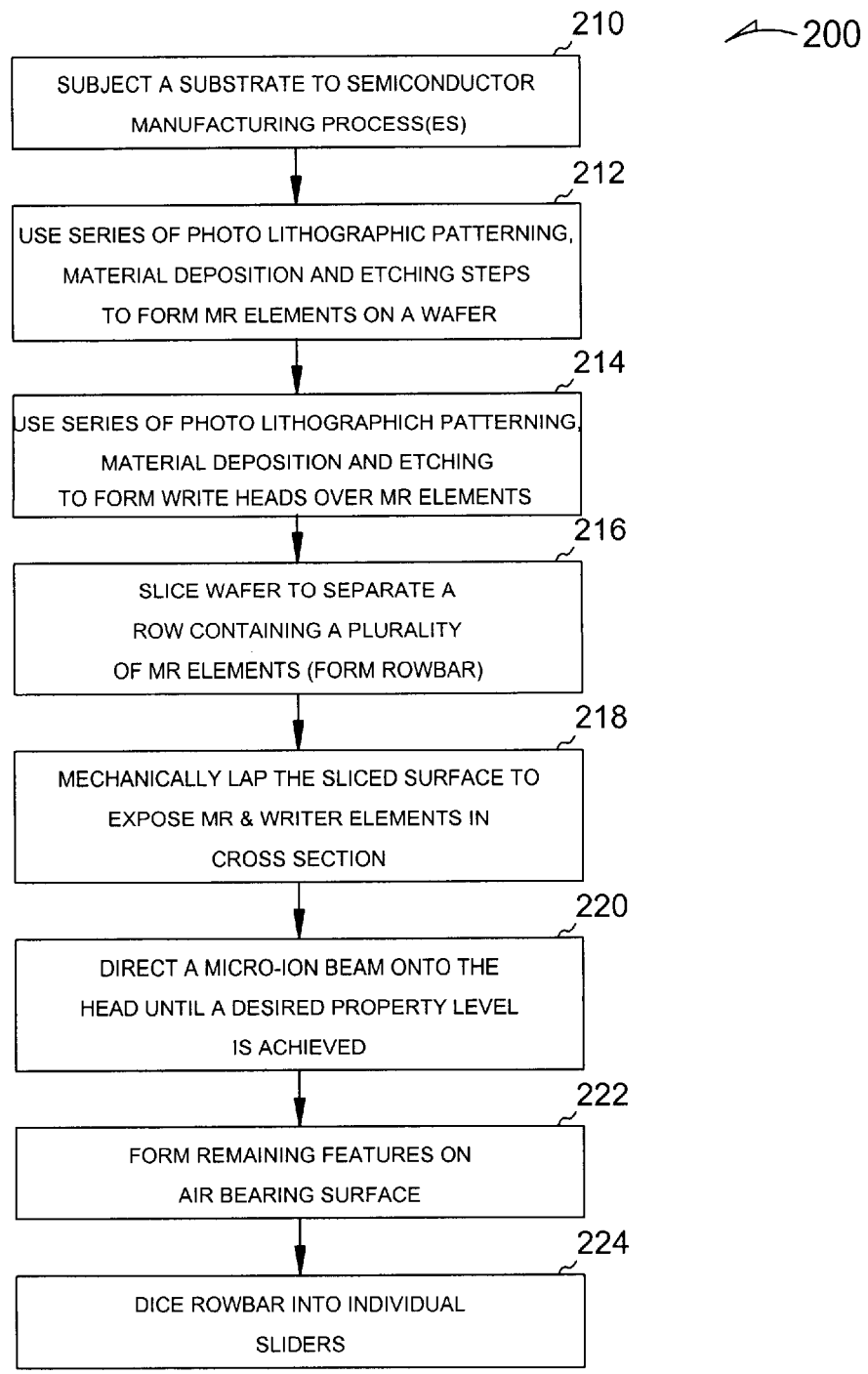
FIG. 2 is a flow chart showing an overview of the manufacture of sliders which include a thin film write element and a magnetoresistive read element.

The invention of this application deals with forming the slider 126. The slider 126 is shown in more detail in FIG. 3. FIG. 2 shows an overview of the process 200 for forming sliders. The process starts with a wafer. The first step is to subject a substrate or wafer to semiconducting processes such as depicted by reference numeral 210. Using a series of basic semiconducting formation processes, such as photolithographic patterning, material etching, and material deposition, active elements are formed. Using various combinations of these processes, many layers are added and shaped on the wafer. After many steps, a multitude of active devices are formed. In this case, the active elements are MR elements and writer elements. Magnetoresistive elements are formed on the wafer, as depicted by step 212. The next step is to form write heads over the MR elements, as depicted by reference numeral 214. It should be noted that a magnetic shield or shields may be placed between the magnetoresistive elements and the write heads formed. The shields may include several other layers that are also formed by a semiconductive process. The combination of a magnetoresistive element and a write head form a transducer 150 (shown in FIGS. 1 and 3). It should also be noted that there are a multiplicity or a very large number of transducers 150 are formed on a wafer. The multiplicity of MR elements 152 and write elements 156 are organized in rows on the wafer so that the wafer may be cut or sliced to form a bar that includes a row with a plurality of transducers 150. Once all of the transducers 150 are formed, the wafer is cut or sliced to form elongated bars containing rows of transducers or containing rows which include rows of MR elements, as depicted by step 216 in process 200. These elongated rows of transducers are placed in carriers and initially lapped to smooth the surface, provide a first rough removal of material, and expose MR and writer elements in cross section as depicted by step 218 in process 200. The next step is to remove additional material from the surface of the rowbar to produce a selected stripe height of the MR elements, as depicted by step 220. The stripe height of a MR element is linked or a function of the resistivity associated with the stripe in a MR element. Another way of looking at step 220 is that material is removed until a measured resistivity is within a selected range corresponding to a selected stripe height of the MR element. After the stripe height has been controlled to a desired level of resistivity, the remaining features on the air-bearing surface are formed, as depicted by reference number 222 of process 200. Step 222 may also include additional steps to selectively etch the pole tip of the writer element to correct, set or compensate for pole tip recession or protrusion relative to the plane of the air beaing surface of the slider body. After forming the features, the rowbar is cut or diced into individual sliders 126, as depicted by reference numeral 224 and process 200.

Figure 3:
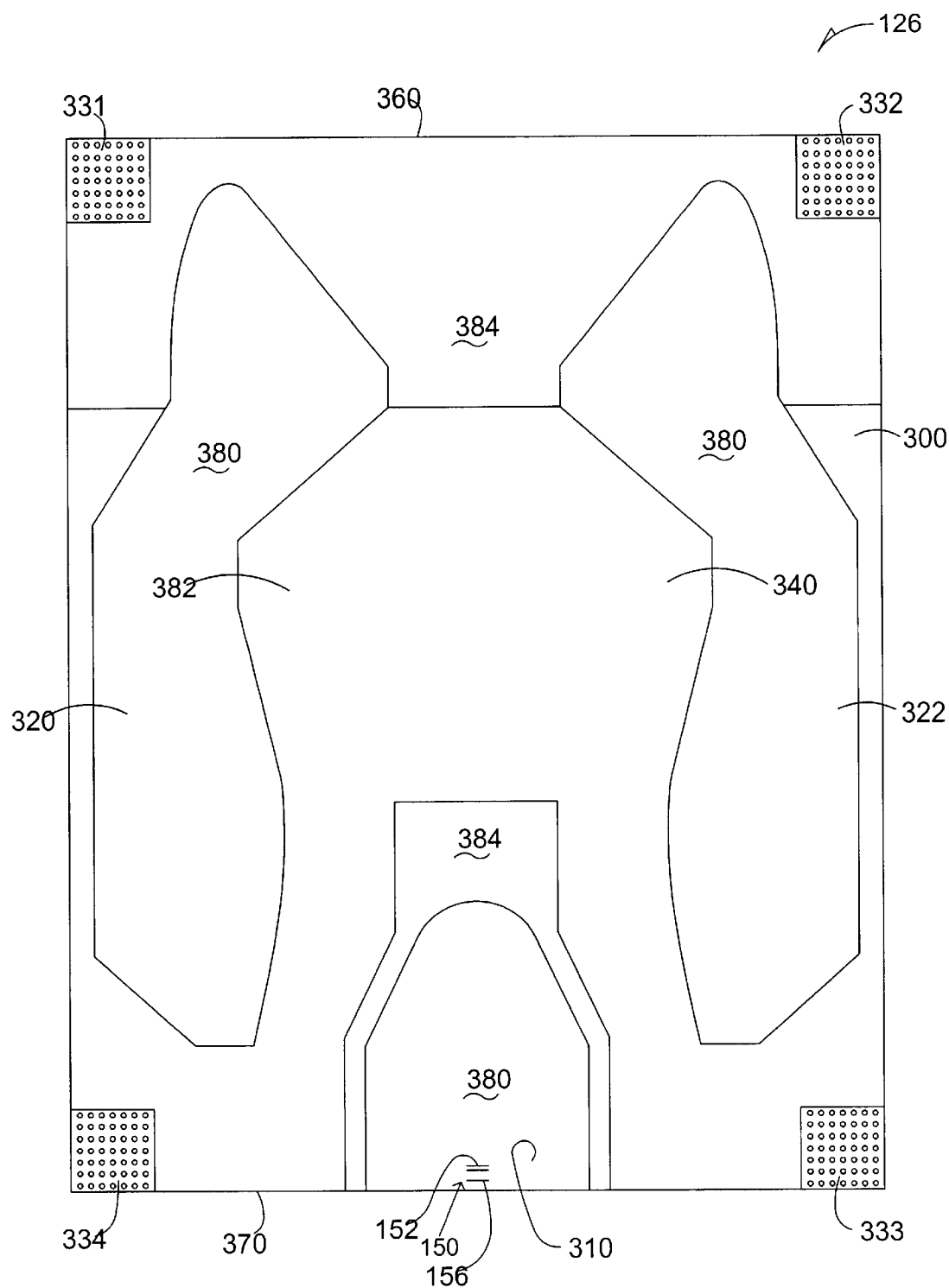
FIG. 3 is a bottom view of a slider showing the air-bearing surface of a slider that includes a thin film write element and a magnetoresistive read element.

FIG. 3 is a bottom view of a slider 126 showing an air-bearing surface 300. The air-bearing surface includes a number of features formed by semiconductor process steps. The features include a center island 310, a first side rail 320 and a second side rail 322. The air-bearing surface 300 includes contact portions that contact the disc 134 during take-off and landing of the slider 126. The center island 310 and side rails 320 and 322 may contact the disc if the disc drive is a contact start stop disc drive. A cavity 340 is typically formed between the side rails 320 and 322 as well as the center island 310. The cavity 340 is the portion of the air-bearing surface 300 that produces negative pressure. The slider also has a leading edge 360 and a trailing edge 370.

Positioned at or near the trailing edge 370 is the transducer, denoted generally by reference number 150. As shown in FIG. 3, the transducer 150 includes a separate read element 152 and a write element 156. The write element 156 is a thin film head that is positioned on the trailing edge 370 of the slider 126. The read element 152 is an MR element positioned in from the trailing edge 370 of the slider 126. It should be noted that a MR element may include a giant MR or super MR element. The MR element 152 is shielded from the write element 156. The initial step in forming a slider 126 is to form a plurality of MR elements 152 and write elements 156 on a wafer. The MR element (read element 152) and the thin film head (write element 156) are formed on a wafer using semiconductor device fabrication techniques. As mentioned previously, the MR elements 152 and write elements 156 are placed on a wafer so that the wafer may be cut or sliced to form a bar that includes a row of the plurality of transducers 150. Once formed the wafer is cut or diced to form the elongated bar containing a row of transducers. These elongated rows of transducers are placed in carriers and initially lapped to smooth the surface and provide a first "rough" removal of material.

Ion beam etching is a physical process. There are a number of methods that can be used to remove material by ion bombardment. One method known generally as ion milling is described here as an example. The wafers are placed on a holder in a vacuum chamber and a stream of argon is introduced into the chamber. Upon entering the chamber, the argon is subjected to a stream of high-energy electrons from a set of cathode (−) and anode (+) electrodes. The electrons ionize the argon atoms to a high-energy state with a positive charge. The wafers are held on a negatively biased holder that attracts the positive argon ions. As the argon ions travel to the wafer holder they accelerate, picking up energy. At the wafer surface they crash into the exposed wafer layer and literally blast small amounts from the wafer surface. Scientists call this physical process momentum transfer. No chemical reaction takes place between the argon ions and the wafer material. Ion beam etching is also called sputter etching or ion milling. Material removal (etching) using ion milling is highly directional (anisotropic). Furthermore, different materials can etch at different rates, all things being equal. Material-dependent etch rates may represent an undesirable consequence of ion etching, in which case, further etching using a micro-ion beam of selected material or regions may be invoked to compensate for this negative consequence of the initial etch step. Material-dependant etch rates may also be used to correct for undesirable topography that is introduced during some rowbar fabrication process other than ion milling or focused ion beam etching.

Figure 4:
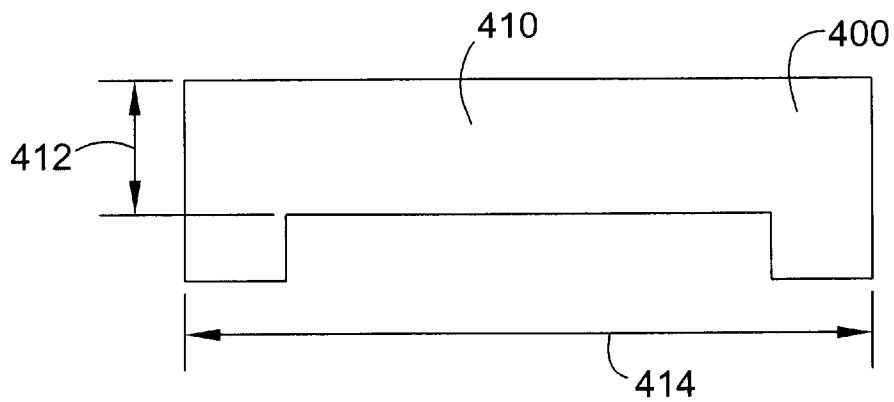
FIG. 4 is a cutaway side view of a magnetoresistive element.

The lapping removes material from the magnetoresistive element. Even after lapping, the standard deviation for resistance associated with the magneto resistance element is rather high. FIG. 4 is a cutaway side view of a magnetoresistive element. A magnetoresistive element 400 includes a stripe 410 that has a width or height, 412, and a length 414. The stripe height 412 is related to the resistance of the magnetoresistive element 400 as discussed above. Lapping removes material to produce a stripe 410 having a desired stripe height 412 and a desired electrical property, such as resistivity.

Figure 5:
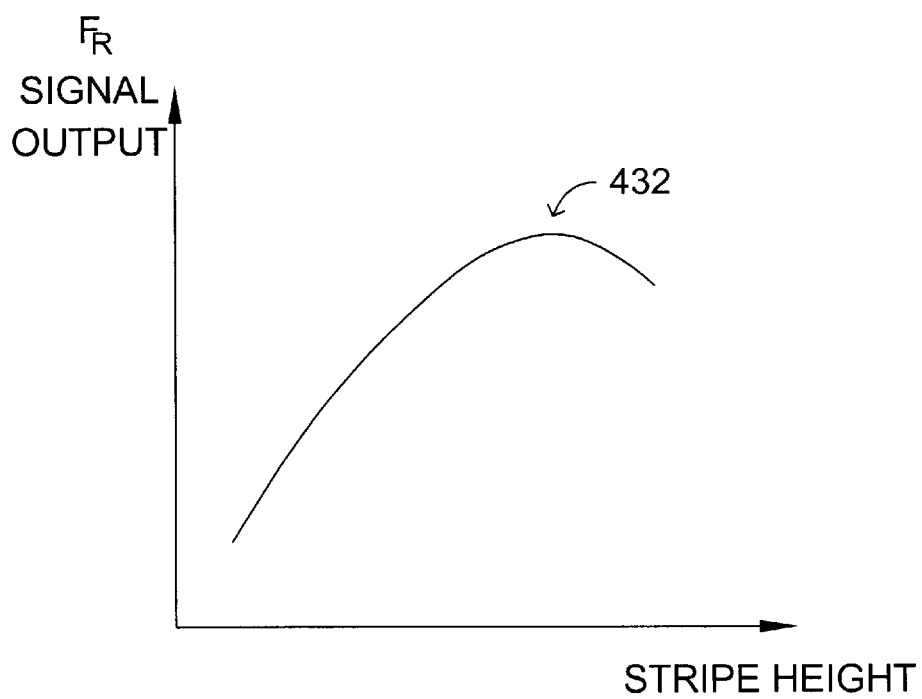
FIG. 5 is a plot of signal output vs. resistance from a magnetoresistive element.

FIG. 5 is a plot 430 of the change resistance ("ΔR") (y axis) vs. stripe height (x axis) from a magnetoresistive element 400. As can be seen, the ΔR (y axis) from a magnetoresistive element 400 is a maximum at a particular stripe height (x axis). The response of the MR element or ΔR (y axis) is related to its stripe height (x axis). As can be seen from the plot shown in FIG. 4, there is an optimal point 432 where the ΔR (y axis) from the magnetoresistive element is optimum for a given stripe height. If the stripe height is less than the stripe height associated with the optimum point 432, the change in resistance ("ΔR") is less than the maximum. If the stripe height is thicker than the stripe height associated with the optimum point 432, ΔR is also less than the maximum.

MR elements 152 respond to the presence of a magnetic field by undergoing a change in resistance. When a magnetic field is present, rotation of the MR element's magnetic moment produces the resistance change (Δ resistance) that in turn produces a voltage change across the conductor leads of the MR element according to $$\Delta V = I \Delta R$$

where I is the sensor current passing through the MR element 152. Thus, by maximizing ΔR, the output signal ΔV is also maximized.

Figure 6:
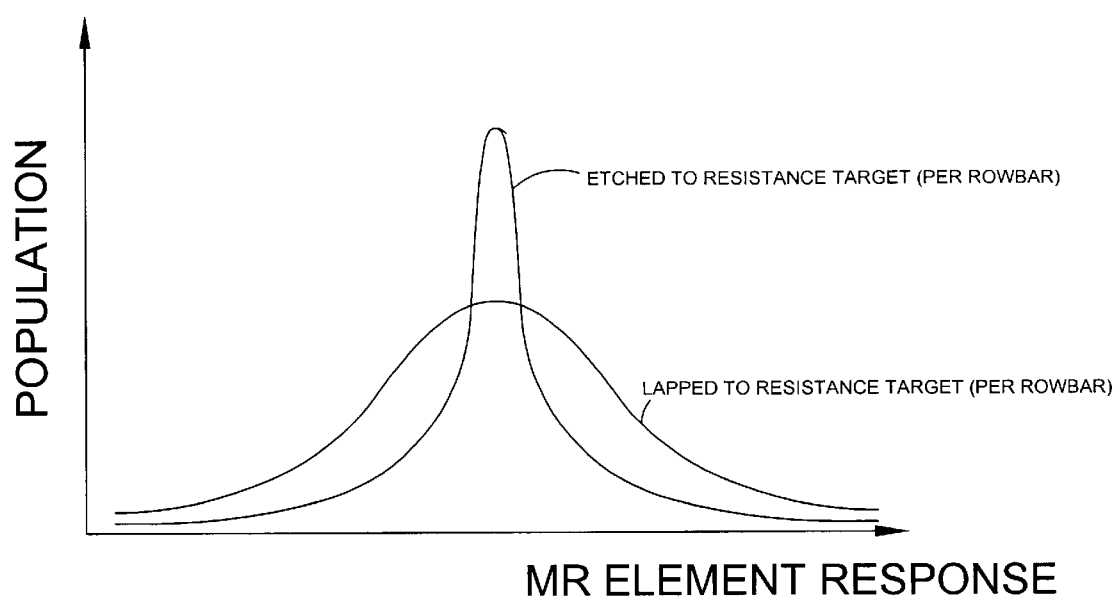
FIG. 6 is a chart showing the standard deviation or spread of a population of magnetoresistive elements lapped to resistance target per rowbar, as compared to the standard deviation or spread of a population of magnetoresistive elements where each magnetoresistive element is etched to resistance target per slider.

FIG. 6 is a chart showing the standard deviation or spread among a population of magnetoresistive elements that have all been uniformly lapped. The standard deviation from the mean value of ΔR is somewhat high. In other words, the ΔR varies somewhat across the population of magnetoresistive elements after all the MR elements are subjected to the same amount of lapping. Not all the magnetoresistive elements will operate at or near the region on the reader response curve 430 representing maximum sensitivity 432, that will produce the highest signal output, ΔV for a given sense current.

In order to narrow the standard deviation of a population of MR elements so that more of the MR elements will have optimum or maximum ΔR, it is necessary to use the method and apparatus described in more detail below to control the amount of material removed during the etching process so that the stripe height on individual heads may be controlled to produce ΔR values that are at or near the optimal values. Of course, producing MR elements with ΔR values near the maximum also produces MR elements that output maximum signal ΔV for a particular sense current I. In other words, by controlling the stripe height and or the resistivity of the MR stripe of various MR elements during manufacture, better, more uniform read signals ΔV result from a population of MR elements. Another aspect of maximizing ΔR is by etching to a cleanliness endpoint (as opposed to a resistance endpoint) as reflected by the monitoring of the first derivative of resistance versus time (dR/dt). By removing extraneous material that could cause shorting of the reader element and magnetically dead layers of oxide and/or organic surface contamination on an individual head basis, the process will increase the yield of electrically stable MR heads.

Figure 7:
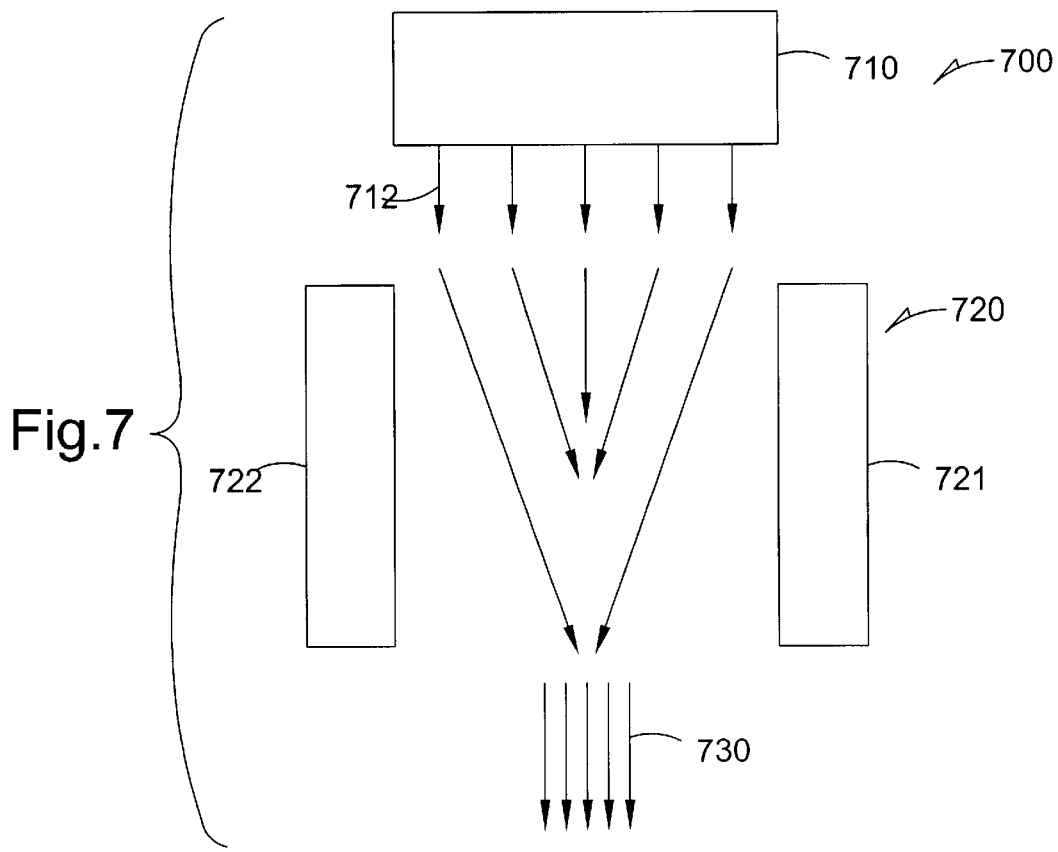
FIG. 7 is a schematic view of a micro-ion beam and beam focusing elements.

To remove material from the individual stripes of individual MR elements, a micro-ion beam or focused ion beam element is used. FIG. 7 is a schematic view of a micro-beam or focused ion beam element. The micro-beam element 700 includes a source for forming the ion beam 710 and a lens 720 for shaping the beam. The ion source 710 produces essentially a uniform beam of ions, as depicted by arrow 712. The lens 720 focuses or moves the ion beam 720 so that they are focused on a point or focused such that they produce a very narrow ion beam 730 at a target, such as an MR stripe of a single MR element 152 on a rowbar having a plurality of MR elements. The lens 720 is anything that can focus the ion beam 712. The lens elements 722 and 721 may be individually controlled to move the focal point of the ion beam. Additional beam control elements may be used to move the beam 730 to various positions, both laterally and vertically, with respect to a target (not shown). The focused ion beam is generally blanked before it is repositioned as part of carrying out the process.

Figure 8:
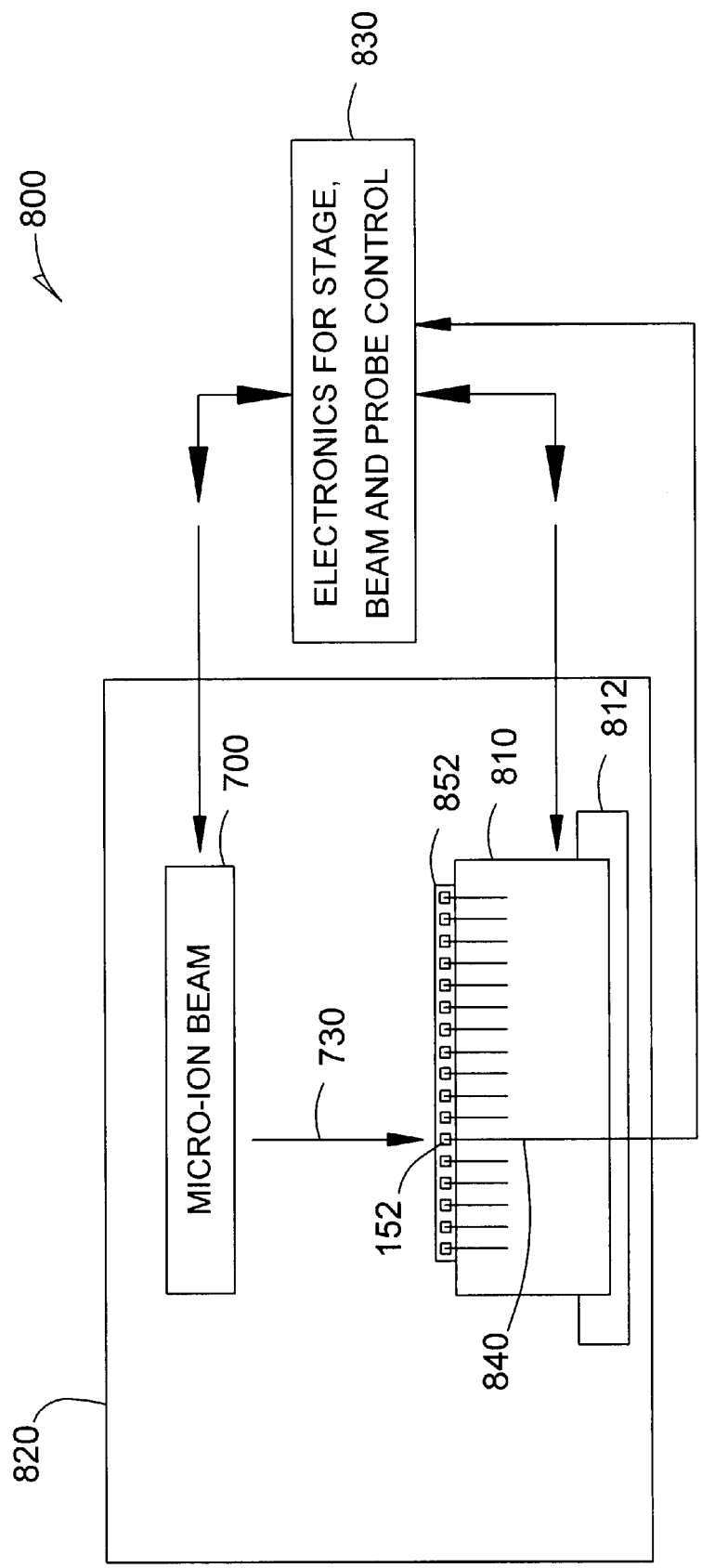
FIG. 8 is a schematic view of a rowbar including a plurality of magnetoresistive elements selectively subjected to a micro-ion beam.

FIG. 8 is a schematic view of the apparatus 800 which is used to remove material from individual MR elements 152 of a rowbar 852 that includes a plurality of individual MR elements. The apparatus 800 includes a micro-beam element 700 and a carrier 810 situated within a vacuum chamber 820. The carrier element 810 includes a stage 812. As stage 812 moves, carrier 810 moves. Also included are control electronics 830. The control electronics 830 control the focused beam or micro-ion beam element 700, as well as the stage 812, and an electrical probe system 840 which connects a probe or probes to individual MR elements 152. The electrical probes are shown or depicted by signal carrier 840 which carries a signal related to a parameter being measured as a micro-ion beam removes material from a particular MR element 152. The micro-ion beam 730 and the electrical probe system 840 are combined within the vacuum chamber 820 to facilitate per device or a per-MR element 152 micro-milling of electrical devices in which the electrical performance depends upon the physical geometry of the device structure. Such a device is a MR element 152. The resistivity of the MR element depends upon the stripe height of the MR element. The electrical properties of such devices are adjusted via removal of material by ion milling or ion etching. As the ion milling is taking place with a focused beam 730 on a first area, the electrical property of the first area is simultaneously monitored using the electrical probe system 840. The signal produced by the electrical probe system situated at the first area is fed back to the control electronics 830. The signal from the probe electronics act as a control signal in a control loop and enables accurate targeting or specification of the magnitude of a desired electrical property or properties in the first area. As soon as the desired value of the electrical property or properties of the first area is reached, the control electronics 830 stop the etching or removal of further material from the first area or the first particular device, such as an MR element 152. Generally, the control electronics will blank the ion beam or deflect the ion beam 730 to the side where it will not remove material from other areas or another element or device on the rowbar 852. The beam 730 is deflected until the control electronics move the stage 812 upon which rests the carrier 810 so that another MR element, at a second area, will be positioned directly below the beam 730. Generally, the areas that are exposed to the ion beam 730 are successive or placed next or near one another. However, it should be noted, that the areas need not be successive. The process of removal of material using the focused beam 730 is then repeated with the next individual device or individual MR element 152.

The process cycle generally includes engaging the electrical probe 840 to the pad or pads of the MR element 152, then ion etching the MR element to an electrical end point where a particular electrical property being measured via the probe is at a desired level. The next step is to stop the etch upon reaching the end point and then disconnect the probe and then move the stage or redirect the ion beam 730 so that it is positioned on a new area which includes a new MR element or device to which the electrical probe 840 has been attached. Generally, the focused beam is blanked while the stage is translated. In this particular embodiment, the electrical probe 840, an ion gun or micro-beam element 700 are held stationary and the rowbar 852 is translated using the stage 812 until a new area containing a new MR element is positioned in front of the focused beam 730 from the micro-ion beam or focused beam element 700. Generally, the areas are successive areas where a first area is adjacent the second or new area. However, there is no requirement that the areas be successive.

It should be noted, however, that each of the individual MR elements 152 on a rowbar 852 can be electrically connected to a probe device at the beginning of the process. In other words, each of the individual MR elements could simultaneously be attached to a probe and then the output from each probe is monitored, in a multiplexed fashion, as the MR element is being bombarded by the ion beam 730 could be passed to the control electronics as the feedback control signal. Such a modification would include a multiplexed switching of the various probes to produce an output back to the control electronics 830. Yet another modification contemplated by this invention would be to deflect the ion beam 730 so that the focused ion beam is now directed to an adjacent area or new device or MR element 152. Deflection the beam could also be controlled by the control electronics 830.

It should be noted that the probe 840 is not necessarily a single wire. Typically, a transducer 150 will include an MR element 152 and a write element 156. Each of these elements is in contact with (or is contacted by) the probes via a bond pad of similar feature. This means that the electrical probe 840 is essentially consisting of multiple electrical contacts rather than just a single electrical contact. In some instances, the probe may have multiple contacts per bond pad. For example, in a transducer 150 that has two electrical contact pads for an MR element 152 and two electrical contact pads for a write element 156, a pair of electrical contacts may be provided for each contact pad to increase the reliability of the contact with the pad. As a result, the electrical probe assembly 840 would have eight wires or probes. Those skilled in the art should recognize that means other than electrical probe 840 may be used to monitor transducer 150 without departing from the scope of the present invention.

It should also be noted that one aspect of the invention is that the microbeam used actually steps and pauses over a raster or an area where the material is to be removed. The step distance is typically a percentage of the size of the finely focused beam. For example, if the step distance is 50%, the beam will overlap its previous position by 50%. In other words, if the beam is 100 microns, the step distance would be 50 microns in the above example. Once stepped, the beam stays in a particular spot for a specific amount of time. This is generally known as dwell time or static time. Of course, removing more material requires a longer dwell time or static time. The microbeam is generally stepped and paused over the entire size of the raster to remove material from the individual MR element. The raster size can be anything including any type of polygon or any other kind of geometric shape. The raster size could even be over any part or the entire surface of the slider air bearing surface 300, including MR element 152. One aspect of the invention is that the dwell time may be selectively varied to control the geometric shape formed in x, y and z (depth). For example, by varying the dwell time, the trailing edge of the slider is contoured, shaped or trimmed in order to mitigate head-disc interactions to improve drive performance.

Figure 9:
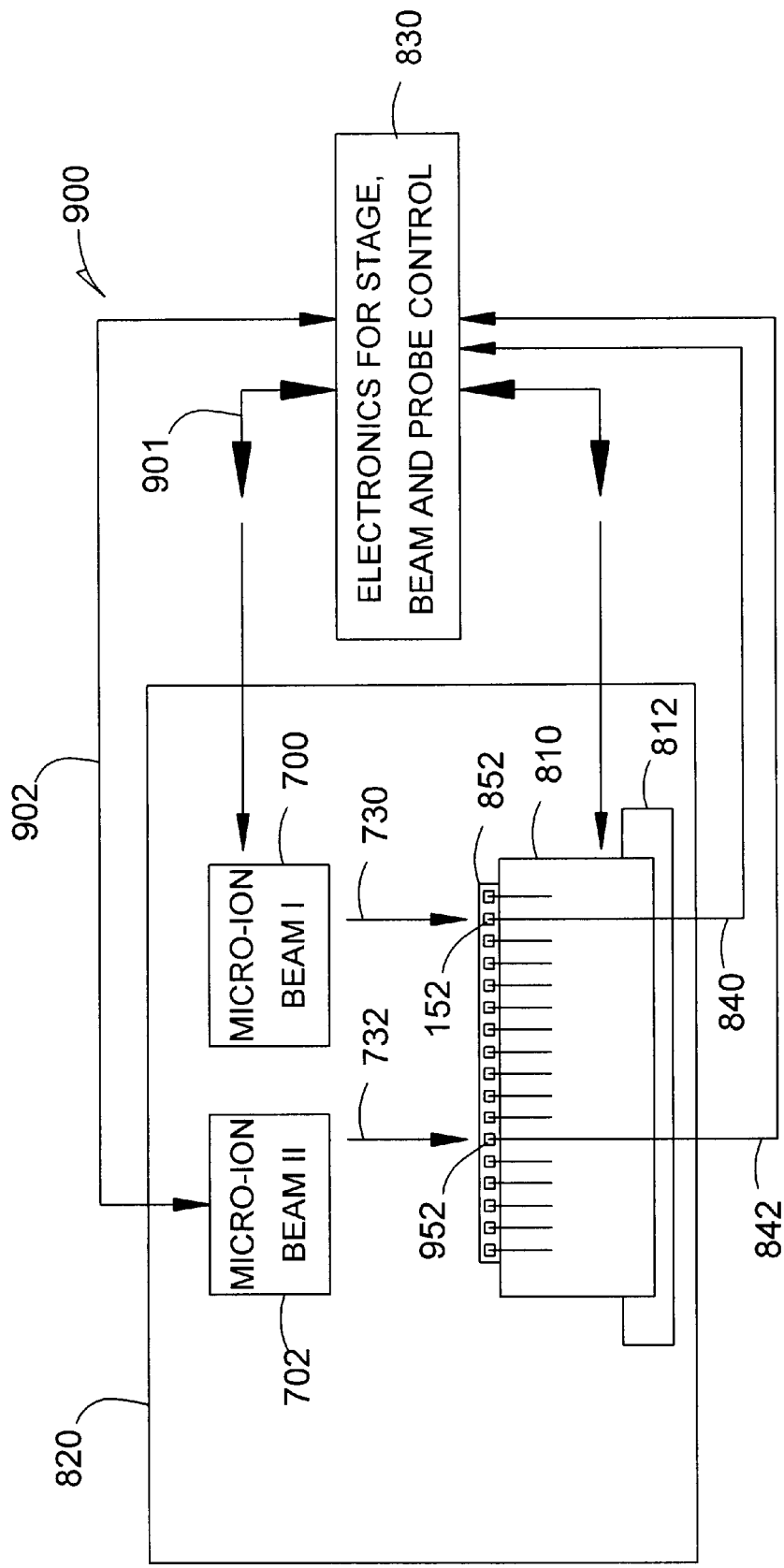
FIG. 9 is a schematic view of a rowbar including a plurality of magnetoresistive elements selectively subjected to a plurality of micro-ion beams.

FIG. 9 is a schematic view of another apparatus for selectively removing material from devices such as MR heads within a rowbar 852. The apparatus 900 of FIG. 9 is similar in operation to the apparatus 800 shown in FIG. 8. Rather than describe the entire apparatus in detail, for the sake of clarity, the differences between the apparatus 900 and the apparatus 800 will be discussed. The apparatus 900 includes two focused ion beam elements 700, 702, as compared to a single micro-ion beam element 700 used in apparatus 800. Each of the micro-ion beam or focused beam elements 700 and 702 is controlled by the control electronics 830. As a result, the control electronics include a first line 901 for controlling the micro-beam 700 and a second line 902 for controlling micro-beam element 702. Micro-beam element 700 produces a focused beam 730 that acts on a first MR element 152 and micro-beam element 702 produces a focused beam 732 that acts on a second MR element 952. A first electrical probe 840 is connected to MR element 152 and a second electrical probe 842 is connected to the second MR element 952. Both electrical probes produce signals which are fed back to the control electronics 830. The main difference is that two ion beams 730 and 732 are produced simultaneously and can work on two MR elements 952, 152 on a rowbar 852.

Figure 10:
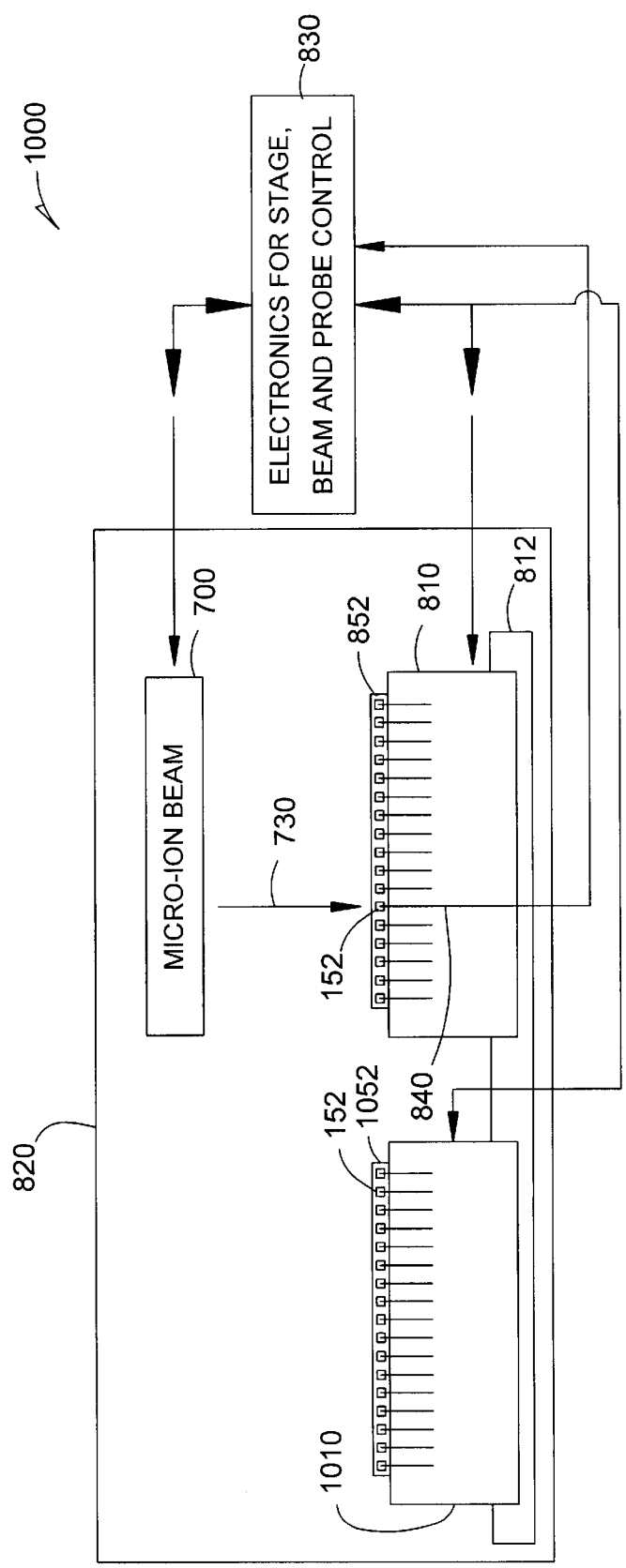
FIG. 10 is an apparatus which includes a single focused ion beam and multiple carriers and stages.

FIG. 10 is a schematic view of an apparatus for removing material from MR elements 152 associated with a first carrier 810 and stage 812, as well as MR elements 152 associated with a second carrier 1010. Again, only the differences between this particular embodiment and the embodiment shown in FIG. 8 will be discussed for the sake of clarity. The main difference is that there is an additional carrier 1010, which carries a rowbar 1052 having individual MR element 152 therein. The carrier 1010 is also controlled by the control electronics 830. As a result, there is an additional control line from the control electronics 830 to the carrier 1010. It should be noted that although single rowbars 1052 and 852 can be transferred to and from stage 812, there could be multiple rowbars associated with each carrier 810, 1010. As a result, the stage would be an X, Y stage which could move multiple carriers 810 or multiple rowbars within a carrier 1010 into and out of the path of the micro-ion beam.

Figure 11:
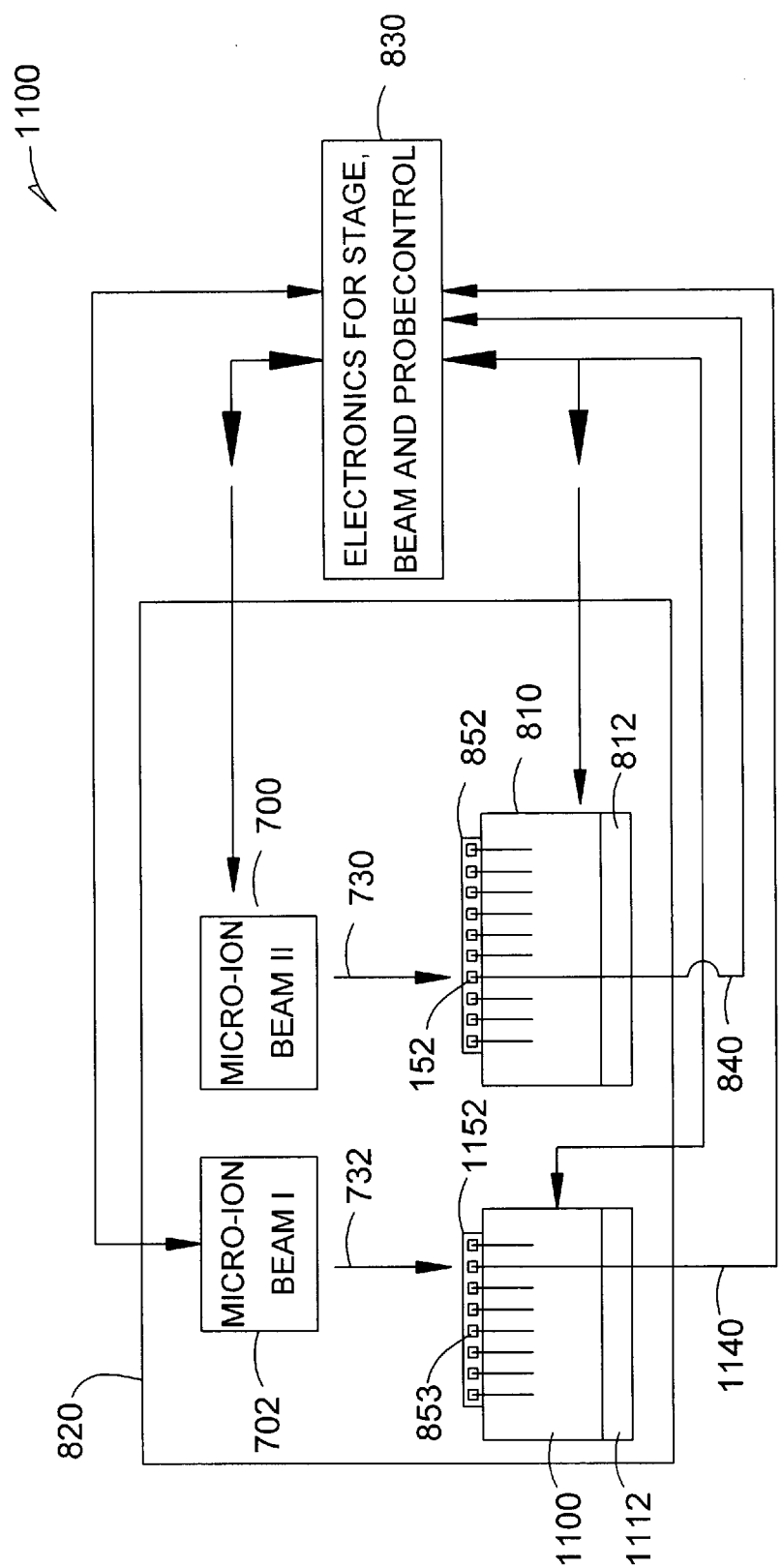
FIG. 11 is an apparatus that includes multiple focused ion beam elements and multiple carriers and stages.

FIG. 11 shows an apparatus 1100 for controlling two focused beam devices and two carriers and stages. The apparatus includes a control electronics 830 capable of controlling each micro-beam element 700, 702 and capable of controlling each stage 820, 1120 of the respective carriers 810, 1110. Feedback control is produced by electrical probe systems 840 and 1140. Each of the electrical probes engages the device or MR element 152, 853 and monitors the resistance as the focused ion beam 730 acts on element 152 and as focused ion beam 732 acts on element 853. When the resistance meets a desired level, the control electronics 830 deflect or stop the respective beams 730 and 732 independently of one another so that each MR element can be formed to the exacting standards required.

Figure 12:
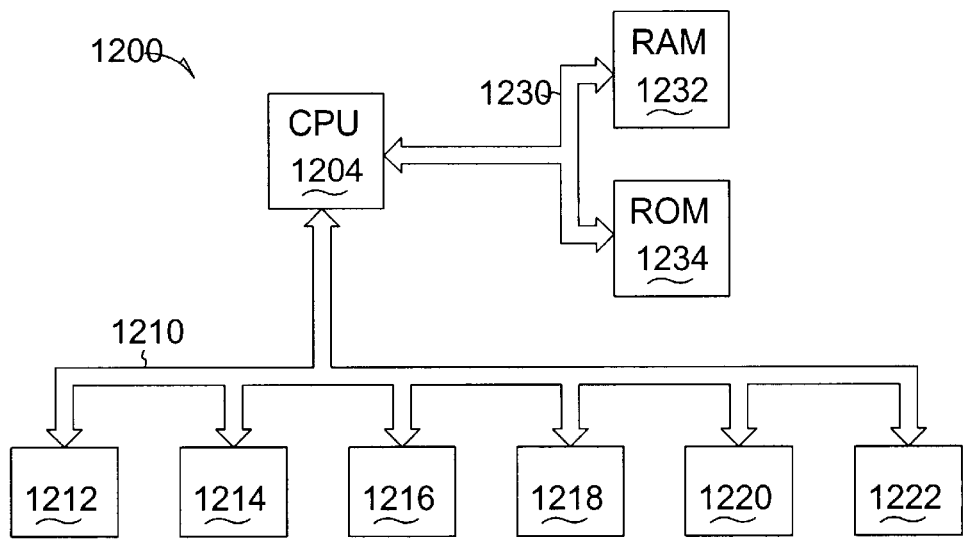
FIG. 12 is a schematic view of a computer system.

FIG. 12 is a schematic view of a computer system 1200 used as part of the control electronics. The computer system 1200 may also be called an electronic system or an information handling system and includes a central processing unit, a memory and a system bus. The information handling system includes a central processing unit 1204, a random access memory 1232, and a system bus 1230 for communicatively coupling the central processing unit 1204 and the random access memory 1232. The computer system 1200 may also include an input/output bus 1210 and several devices peripheral devices, such as 1212, 1214, 1216, 1218, 1220, and 1222 may be attached to the input output bus 1210. Peripheral devices may include hard disc drives, magneto-optical drives, floppy disc drives, monitors, keyboards and other such peripherals. Any type of disc drive may use the slider having the surface treatment discussed above. The computer system is programmable and acts in response to program instructions. A software program is loaded onto the computer system 1200. The software program provides control functions which a user can use to select and implement the various processes described in the above paragraphs.

Figure 13:
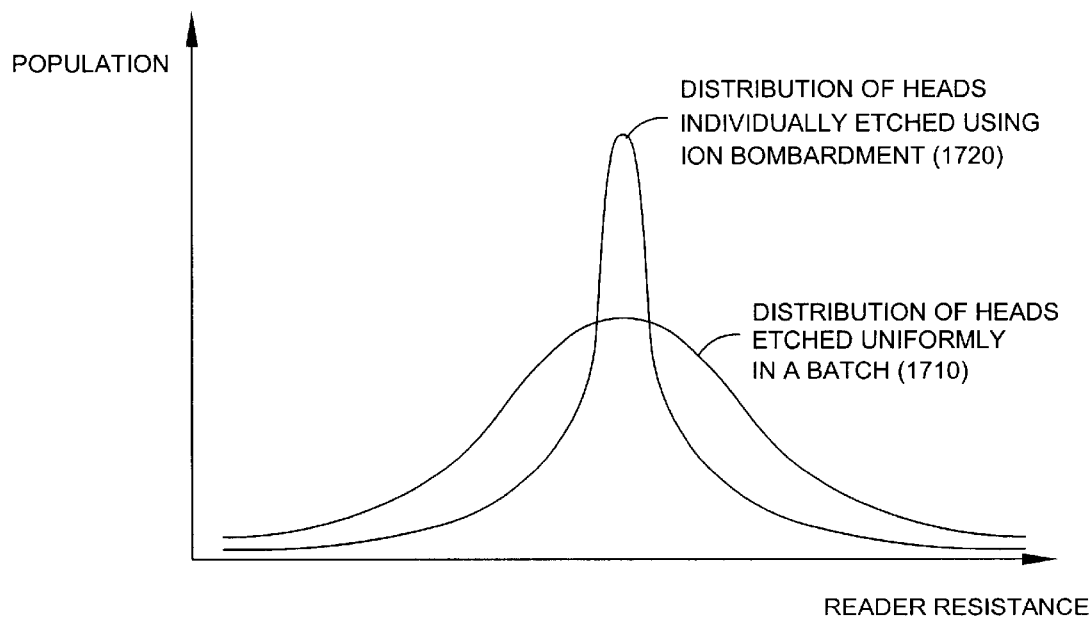
FIG. 13 is a chart showing standard deviation among magnetoresistive elements that have been etched uniformly in a batch, as compared to a sample of magnetoresistive elements that have been made using the instant invention.

Referring now to FIG. 13, which is a chart showing standard deviation among magnetoresistive elements that have been etched uniformly in a batch, which carries reference number 1710 as compared to a sample of magnetoresistive elements that have been made using the instant invention represented by curve 1720. The comparison shows that the standard deviation of the magnetoresistive elements 400 (shown in FIG. 4) that have been ion etched using the ion-beam system have much lower standard deviation about the ΔR value of MR elements. The ΔR value will correspond to the optimum ΔR value discussed previously. This allows designers to design to a particular optimum level of resistivity for all the transducers 150, and helps disc drives achieve increased aerial density as compared to other methods.

Advantageously, the method and apparatus allows for careful control of the dimensions of an MR element or set of MR elements so that the signal output of each MR element can be within a selected, optimized range. The method and apparatus is both quick and reliable, such that the method and apparatus can be used in production of MR elements for disc drives. As a result of the ability to control dimensions or a particular dimension of the MR element, information stored at higher aerial density can be reliably detected or read. Yet another advantage is that MR elements in a population can be made to be more uniform across a population of MR elements. In other words, the standard deviation of the MR elements is reduced which enhances the ability to introduce higher capacity disc drives using this technology. Thus, disc drives capable of still further increases in storage capacity can be produced at the manufacturing level.

CONCLUSION

A method for producing magnetoresistive heads includes the steps of placing a substrate having a plurality of transducers in an environment including a focused ion beam. In one embodiment, the substrate may include a rowbar. The focused ion beam is directed onto a first area of the rowbar which includes the first magnetoresistive element. A property level of the first magnetoresistive element is monitored as the focused ion beam acts on the first magnetoresistive element until the property level of the first magnetoresistive element reaches a desired level. The focused ion beam is redirected onto a second area of the rowbar, which includes the second magnetoresistive element. A property level of the second magnetoresistive element is monitored as the focused ion beam acts on the second magnetoresistive element until the property level of the second magnetoresistive element reaches a desired level. Monitoring a property level includes the step of measuring the property level of the first magnetoresistive element and measuring the property level of the second magnetoresistive element. Monitoring of a property level can occur before, during, or after the exposure of the magnetoresistive element to the focused ion beam. Property levels include, but are not limited to, the resistance of the MR element, the cleanliness endpoint of the MR element as represented by the change in resistance vs. time, the pole tip of the writer element and the trailing edge of the slider. The focused ion beam is directed onto a first area of the rowbar, which includes the first magnetoresistive element. The first area includes what eventually becomes the trailing edge area of a slider. The step of redirecting the focused ion beam onto a second area of the rowbar includes moving either the rowbar or the focused ion beam. The step of redirecting the focused ion beam onto a second area of the rowbar by moving the rowbar, includes the steps of placing the rowbar on a carrier, which is turn placed on a stage, and moving the stage so the focused ion beam is directed onto the second area of the rowbar.

An apparatus for use in electromagnetic device fabrication includes a carrier and a rowbar held by the carrier. The rowbar further includes a first transducing element, and a second transducing element spaced from the first transducing element. The apparatus also includes a focused ion beam, and a controller. The controller directs the focused ion beam at an area of the rowbar including the first transducer. The focused ion beam removes material from the first transducer. The focused ion beam is redirected at an area of the rowbar including the second transducer where the focused ion beam removes material from the second transducer. The carrier further is mounted on a stage for moving the rowbar attached to the carrier between a first position and a second position. The movement of the stage is controlled by the controller. The controller moves the carrier to the first position, and moves the carrier between the first position and the second position to redirect the focused ion beam at the second position. The focused ion beam includes a lens for focusing the ion beam, the lens may be under control of the controller. In one embodiment, the lens is electrostatic. The first transducing element and the second transducing element are magnetoresistive elements. The resistivity of the first transducing element and the resistivity of the second transducing element are monitored by the controller. The resistivity of the first transducing element is monitored while the focused ion beam is directed to an area that includes the first transducing element to remove material from the area. The controller directs the focused ion beam to the area including the first transducing element until a desired level of resistivity is measured. The controller monitors the resistivity of the second transducing element while the focused ion beam is directed to an area that includes the second transducing element to remove material from the area. The controller directs the focused ion beam to the area including the second transducing element until a desired level of resistivity is measured. The controller may monitor the resistivity of one of the first transducing element or the second transducing element to determine that focused ion beam is directed to an area that includes one of the first transducing element or the second transducing element. The resistivity is measured using an electrical probe engaged with the first transducing element. In one embodiment, the apparatus includes both a stage for moving the rowbar attached to the carrier between a first position and a second position and a lens for focusing the ion beam. The lens and the stage are both under control of the controller. Other property levels, other than resistivity, that may be measured and monitored are the cleanliness endpoint of the magnetoresistive element, the pole tip of the writer element and the trailing edge of the slider.

Although the specific embodiments have been illustrated and described herein, it will be appreciated by those of ordinary skill in the art that any arrangement that is calculated to achieve the same purpose may be substituted for the specific embodiments shown. This application is intended to cover any adaptations or variations of the present invention. It is to be understood that the above description is intended to be illustrative, and not restrictive. Combinations of the above embodiments and other embodiments will be apparent to those of skill in the art upon reviewing the above description. The scope of the invention includes any other applications in which the above structures and fabrication methods are used. Accordingly, the scope of the invention should only be determined with reference to the appended claims, along with the full scope of equivalents to which such claims are entitled.

What is claimed is:

1. A method for producing magnetoresistive heads comprising the steps of:
   selecting a substrate having a plurality of transducer elements;
   directing a focused ion beam onto a first area of the substrate which includes a first transducer element;
   monitoring a property level of the first transducer element as the focused ion beam acts on the first magnetoresistive element until the property level of the first transducer element reaches a desired level;
   redirecting the focused ion beam onto a second area of the substrate which includes a second transducer element; and
   monitoring a property level of the second transducer element as the focused ion beam acts on the second transducer element until the property level of the second transducer element reaches a desired level.

2. The method of claim 1 wherein the step of monitoring a property level of the first transducer element further comprises the step of measuring the electrical resistance of the first transducer element.

3. The method of claim 1 wherein the step of redirecting the focused ion beam onto the second area of the substrate includes moving the focused ion beam.

4. The method of claim 1 wherein the step of redirecting the focused ion beam onto the second area of the substrate includes the steps of:
   placing the substrate on a carrier, and
   moving the carrier on a stage so the focused ion beam is directed onto the second area of the substrate.

5. The method of claim 1 wherein the step of redirecting the focused ion beam onto the second area of the substrate includes to step of monitoring the property level of the second transducer element to determine that the focused ion beam is directed to the second transducer.

6. The method of claim 1 wherein the step of monitoring a property level of the second transducer element further comprises the step of measuring the electrical resistance of the second transducer element.

7. The method of claim 1 wherein the step of monitoring a property level of the first transducer element further comprises the step of measuring a cleanliness endpoint of the first transducer element.

8. The method of claim 1 wherein the step of monitoring a property level of the second transducer element further comprises the step of measuring a cleanliness endpoint of the second transducer element.

9. The method of claim 1 wherein the step of monitoring a property level of the first transducer element further comprises the step of measuring a recession or protrusion of the first transducer element relative a plane of the magnetorestive head.

10. The method of claim 9 wherein the first transducer element further comprises a magnetic pole tip.

11. The method of claim 1 wherein the step of monitoring a property level of the second transducer element further comprises the step of measuring a pole tip of a writer element of the second transducer element.

12. The method of claim 1 wherein the step of redirecting the focused ion beam onto the second area of the substrate redirecting the focused beam onto an area including a trailing edge of a slider and etching the trailing edge of the slider.

13. The method of claim 1 wherein the step of redirecting the focused ion beam onto second area of the substrate includes blanking or redirecting the focused ion beam.

14. The method of claim 1 wherein the step of monitoring a property level of the first transducer element is done by a probe engaged with the first area of the substrate.

15. The method of claim 1 wherein the step of monitoring a property level of the second transducer element is done by a probe engaged with the second area of the substrate.

16. The method of claim 1 wherein the substrate is attached to a carrier, the carrier further comprises a stage for moving the substrate attached to the carrier between a first position and a second position and wherein the focused ion beam comprises a lens for focusing the focused ion beam, a deflection system for moving and blanking the focused ion beam, further wherein the lens, stage and the deflection system are under control of the control electronics.

17. The method of claim 1 wherein the substrate further includes a plurality of sliders, further wherein the first area of the substrate includes a trailing edge of a slider, the focused ion beam etches the trailing edge of the slider, and the desired shape of the trailing edge is monitored by the control electronics.

18. The method of claim 1 wherein monitoring the property level of the first transducer element further consists of monitoring an electrical property.

19. The method of claim 1 wherein monitoring the property level of the first transducer element further consists of monitoring a dimension of the first transducer.

20. The method of claim 1 wherein monitoring the property level of the first transducer element further consists of monitoring a strip height of the first transducer.

21. A method for producing magnetoresistive heads comprising the steps of:
- selecting at least one substrate having a plurality of transducer elements;
- directing at least one ion beam onto a first area of the at least one substrate which includes a first transducer element;
- monitoring a property level of the first transducer element as the ion beam acts on the first magnetoresistive element until the property level of the first transducer element reaches a desired level;
- redirecting the ion beam onto a second area of the at least one substrate which includes a second transducer element; and
- monitoring a property level of the second transducer element as the ion beam acts on the second transducer element until the property level of the second transducer element reaches a desired level.

* * * * *

UNITED STATES PATENT AND TRADEMARK OFFICE
CERTIFICATE OF CORRECTION

PATENT NO. : 6,732,421 B2
DATED : May 11, 2004
INVENTOR(S) : Gates et al

It is certified that error appears in the above-identified patent and that said Letters Patent is hereby corrected as shown below:

Column 14,
Line 9, please change "includes to step of" to -- includes the step of --
Lines 35 to 36, please change "substrate redirecting" to -- substrate includes redirecting --

Column 15,
Line 3, please change "strip" to -- stripe --

Signed and Sealed this

Twenty-eighth Day of September, 2004

JON W. DUDAS
*Director of the United States Patent and Trademark Office*